Patented Mar. 26, 1940

2,195,089

UNITED STATES PATENT OFFICE 2,195,089

POLYAZO DYESTUFFS

Theodor Kollmann, Leverkusen-Wiesdorf, Germany, assignor to General Aniline & Film Corporation, a corporation of Delaware No Drawing. Application September 21, 1938, Serial No. 231,015. In Germany September 27, 1937

2 Claims. (Cl. 260—173)

The present invention relates to new substantive green polyazo dyestuffs and to a method of preparing the same.

In U. S. Patent 1,150,656 substantive green polyazo dyestuffs are described which are rendered fast to washing by aftertreatment with formaldehyde on the fiber.

It has now been found that new substantive green polyazo dyestuffs can be obtained, if the dyestuffs are built up, as stated in U. S. Patent 1,150,656 by coupling diazotized acidyl diamines or nitramines or their derivatives, or sulfonic acids with a further diazotizable middle component, further diazotizing the intermediates obtained and then coupling with an aminobenzoylated 2-amino-5-hydroxy-naphthalene-7-sulfonic acid, instead of coupling—as described in the examples of the patent—with m-aminobenz-1.2-naphthimidazol-5-hydroxy-7-sulfonic acid or m-aminobenz-1.2-naphthathiazole-5-hydroxy-7-sulfonic acid, diazotizing, coupling with resorcinol and saponifying or reducing. Under aminobenzoylated 2-amino-5-hydroxynaphthalene-7-sulfonic acids I understand such derivatives of 2-amino-5-hydroxynaphthalene-7-sulfonic acid, in which one hydrogen atom of the amino group in the 2-position is replaced by radicals such as

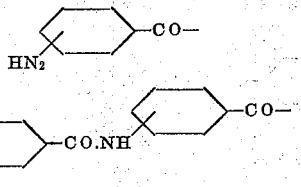

Very clear green cotton dyestuffs of excellent fastness properties are thus obtained.

My new dyestuffs correspond to the following general formula:

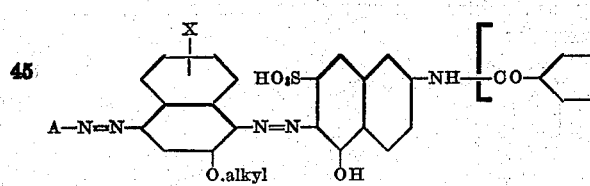

In this formula A—N=N— stands for the residue of a diazotized diamine of the benzene series, X stands for hydrogen or the SO₃H-group and $n$ for the values one or zero.

In comparison with the dyestuffs known from U. S. Patent 1,150,656 the new dyestuffs are distinguished both in the direct dyeing and in the dyeing aftertreated with formaldehyde by a considerably clearer shade, an essentially better neutral and alkaline dischargeability and by a remarkably improved fastness to washing and boiling.

The following examples illustrate the invention, without, however, restricting it thereto, the parts being by weight:

Example 1

26 parts of 1-amino-4-oxalylaminobenzene-3-sulfonic acid are dissolved in 150 parts of water to a neutral solution, 35 parts of hydrochloric acid 19.5° Bé. are added and the mixture is cooled to 0° C.; this is then diazotized in the usual manner with 6.9 parts of sodium nitrite for 2 hours. The complete diazotization is run into a solution of 18.7 parts of 1-amino-2-ethoxynaphthalene in 800 parts of water and 12.8 parts of sulfuric acid 60° Bé. Thereupon the mixture is brought to a pH of 4.5 to 5 by adding 40 parts of anhydrous sodium acetate. The coupling liquor is rendered alkaline at 5° C. with 69 parts of sodium hydroxide solution 38° Bé. and diazotized with 13.3 parts of sodium nitrite and 120 parts of hydrochloric acid 19.5° Bé. in the usual manner. The diazotization product is separated by adding salt, filtered off, pasted again with water and coupled at 0° C. with a solution of 35.8 parts of 2-(3'-aminobenzoylamino)-5-hydroxynaphthalene-7-sulfonic acid in 69 parts of a 20% ammonia solution and 138 parts of pyridine 100%. The paste of the disazo dyestuff is filtered off and again pasted with water and diazotized at 10 to 15° C. with 60 parts of hydrochloric acid 19.5° Bé. and 6.9 parts of sodium nitrite for 4–5 hours and thereupon coupled with 6.9 parts of resorcinol dissolved in water containing 35 parts of sodium carbonate. The complete trisazo dyestuff is separated at 70° C. by adding salt, and filtered off. The paste is saponified with 172 parts of sodium hydroxide solution 38° Bé. at 60° C. for 20 minutes. Then the mixture is acidified by hydrochloric acid, rendered alkaline again by adding sodium carbonate, separated by adding a little salt, and filtered off. The dyestuff thus obtained corresponds in the free state to the following formula:

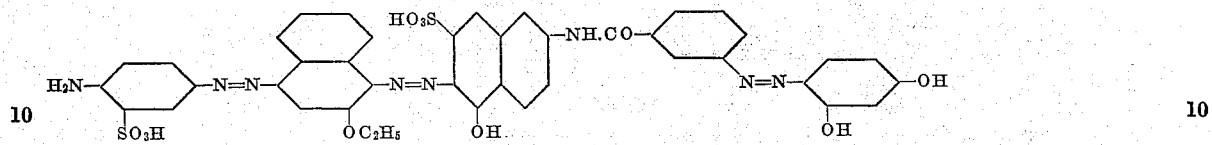

and yields very clear green shades which are both, aftertreated and in the direct dyeing, of an excellent neutral and alkaline dischargeability.

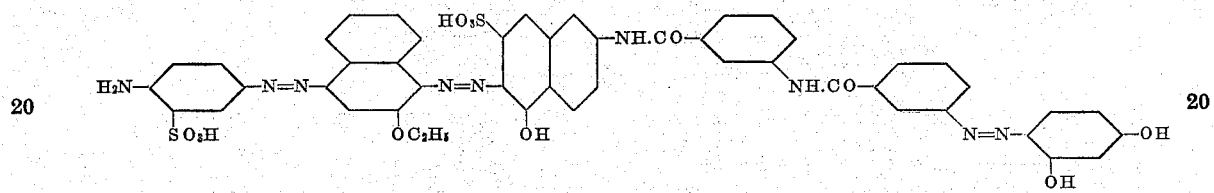

Example 2

26.2 parts of 1-amino-4-oxalylaminobenzene-3-sulfonic acid are diazotized as stated in Example 1, coupled with 18.7 parts of 1-amino-2-ethoxynaphthalene and further diazotized. The paste of the diazotization is filtered off and at 0° C. coupled with a solution of 35.8 parts of 2-(4'-aminobenzoylamino)-5-hydroxynaphthalene-7-sulfonic acid in 69 parts of 20% ammonia solution and 138 parts of pyridine 100%. Further diazotizing, coupling with resorcinol and saponifying of the dyestuff thus obtained is carried out as described in Example 1. The new dyestuff which corresponds in its free state to the following formula:

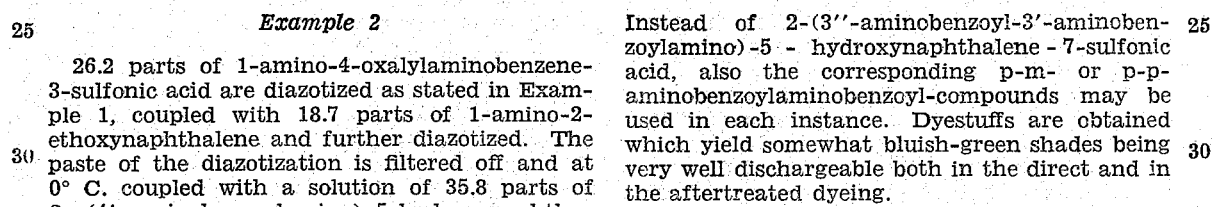

yields bluish-green shades which are distinguished in the direct and in the aftertreated dyeing by a very good neutral and alkaline dischargeability.

Example 3

The azo dyestuff described in Example 1 and obtained from diazotized 1-amino-4-oxalylaminobenzene-3-sulfonic acid and 1-amino-2-ethoxynaphthalene is further diazotized as stated with 13.3 parts of sodium nitrite and hydrochloric acid, filtered off and the diazo compound, which is pasted again, is coupled at 0° C.

with 47.7 parts of 2-(3''-aminobenzoyl-3'-aminobenzoylamino)-5-hydroxynaphthalene-7-sulfonic acid in 69 parts of a 20% ammonia solution and 138 parts of 100% pyridine. Further diazotization, coupling with resorcinol and saponification of the dyestuff, thus obtained, is carried out as described in Example 2. The dyestuff thus obtained corresponds in its free state to the following formula:

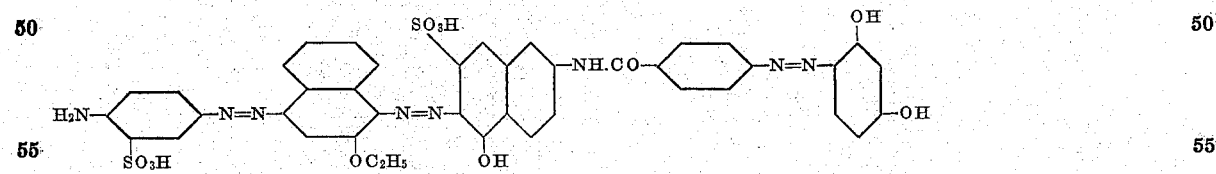

Instead of 2-(3''-aminobenzoyl-3'-aminobenzoylamino)-5-hydroxynaphthalene-7-sulfonic acid, also the corresponding p-m- or p-p-aminobenzoylaminobenzoyl-compounds may be used in each instance. Dyestuffs are obtained which yield somewhat bluish-green shades being very well dischargeable both in the direct and in the aftertreated dyeing.

I claim:

1. As new products substantive polyazo dyestuffs of the general formula:

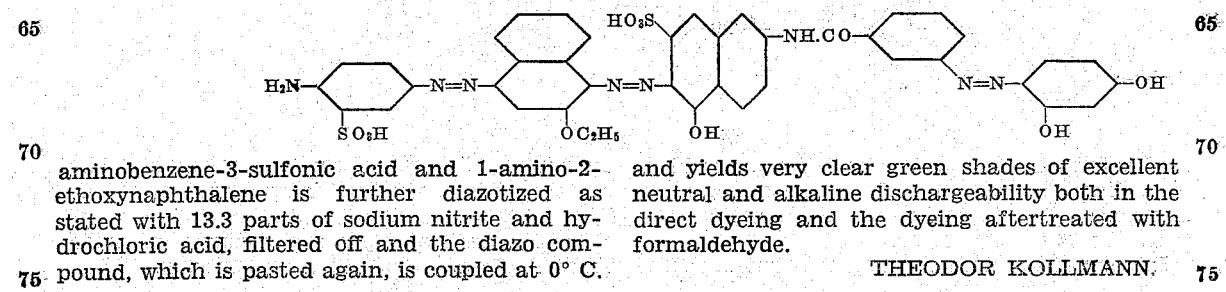

wherein A—N=N— stands for the residue of a diazotized p-phenylene-diamine-3-sulfonic acid X stands for one of the group consisting of hydrogen and the —$SO_3H$ group, and $n$ means one of the values 1 and 0, yielding clear green shades of good fastness properties and excellent neutral and alkaline dischargeability both in the direct dyeings and the dyeings aftertreated with formaldehyde.

2. As a new product the subtantive polyazo dyestuff which corresponds in its free state to the formula:

and yields very clear green shades of excellent neutral and alkaline dischargeability both in the direct dyeing and the dyeing aftertreated with formaldehyde.

THEODOR KOLLMANN.